United States Patent
Dunisch

(10) Patent No.: US 7,955,153 B2
(45) Date of Patent: Jun. 7, 2011

(54) COMPOUND BODY AND A PROCESS FOR THE PRODUCTION OF A MECHANICAL CONNECTION

(75) Inventor: Ingo Dunisch, Wiesbaden (DE)

(73) Assignee: Xenon Technologies (Germany) GmbH, Wiesbaden (DE)

( * ) Notice: Subject to any disclaimer, the term of this patent is extended or adjusted under 35 U.S.C. 154(b) by 0 days.

(21) Appl. No.: 12/704,112

(22) Filed: Feb. 11, 2010

(65) Prior Publication Data

US 2010/0136872 A1    Jun. 3, 2010

Related U.S. Application Data

(62) Division of application No. 10/537,980, filed as application No. PCT/EP03/013022 on Nov. 20, 2003, now Pat. No. 7,687,996.

(30) Foreign Application Priority Data

Dec. 9, 2002    (DE) .................................. 102 57 477

(51) Int. Cl.
*H01J 9/00*    (2006.01)
(52) U.S. Cl. ......................................................... 445/23
(58) Field of Classification Search .............. 445/23–25; 313/623–625
See application file for complete search history.

(56) References Cited

U.S. PATENT DOCUMENTS

| | | | |
|---|---|---|---|
| 1,908,649 A | 5/1933 | Spaeth | |
| 3,360,849 A | 1/1968 | Forman et al. | |
| 3,701,921 A | 10/1972 | Wiedenmann | |
| 3,722,074 A | 3/1973 | Klomp | |
| 4,946,090 A | 8/1990 | Hepburn | |

FOREIGN PATENT DOCUMENTS

| | | |
|---|---|---|
| DE | 2036201 A1 | 2/1971 |
| DE | 3827318 A1 | 3/1989 |
| DE | 195 46 997 A1 | 8/1997 |
| GB | 716927 A | 10/1954 |
| GB | 1301499 A | 12/1972 |
| GB | 2 208 620 A | 4/1989 |
| JP | 50-20086 B | 7/1975 |
| JP | 4046036 A | 2/1992 |
| JP | 8-96776 A | 4/1996 |
| JP | 10-40863 A | 2/1998 |
| JP | 2001-338528 A | 12/2001 |

OTHER PUBLICATIONS

European Patent Office, International Search Report, International Application No. PCT/EP03/13022, Mar. 30, 2004.
Taiwan Patent and Trademark Office, Taiwan IPO Search Report, Date of Completion of Search Mar. 4, 2010 (4 pages).

*Primary Examiner* — Joseph L Williams
(74) *Attorney, Agent, or Firm* — Wood, Herron & Evans, LLP

(57) ABSTRACT

A compound body has a first body part (15) made of glass and a mechanical connection (20, 60) which is melted on the first body part (15) and contains aluminum.

17 Claims, 12 Drawing Sheets

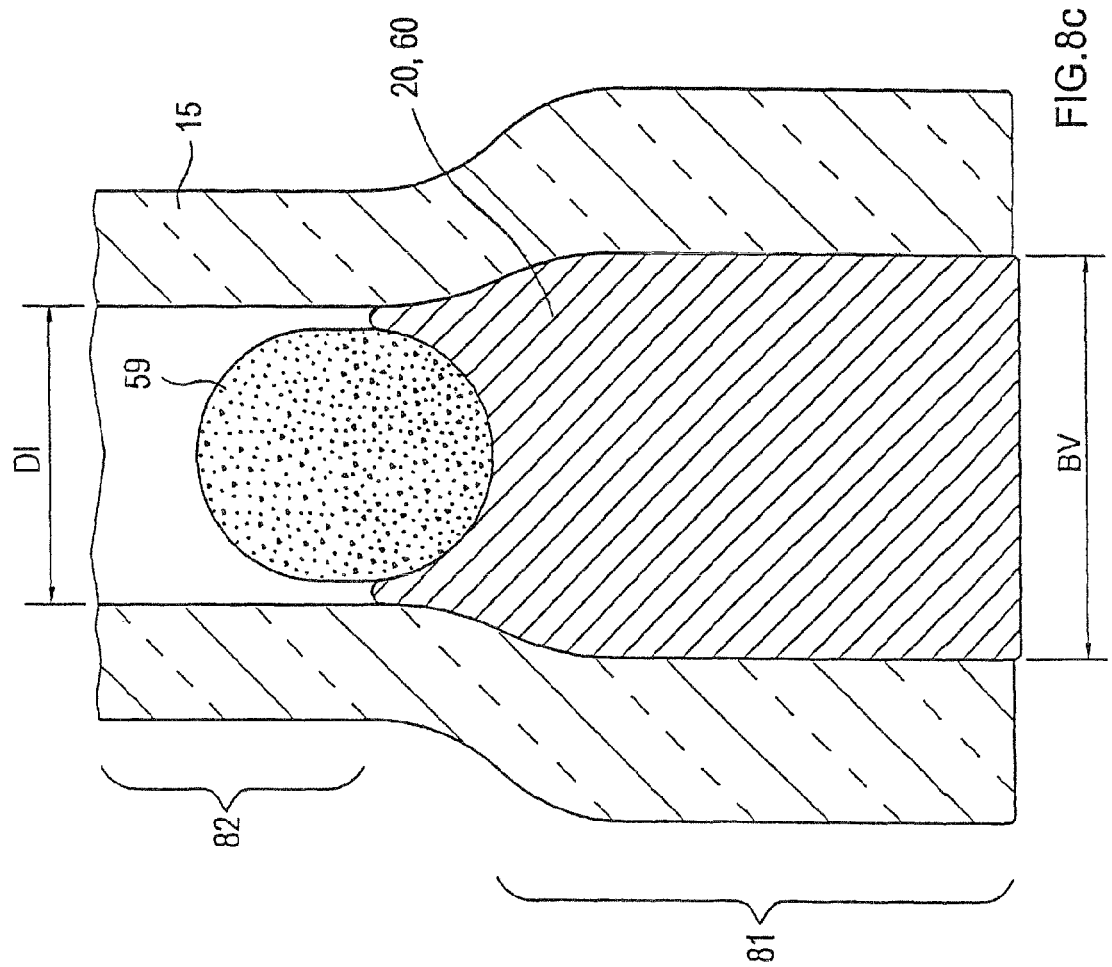
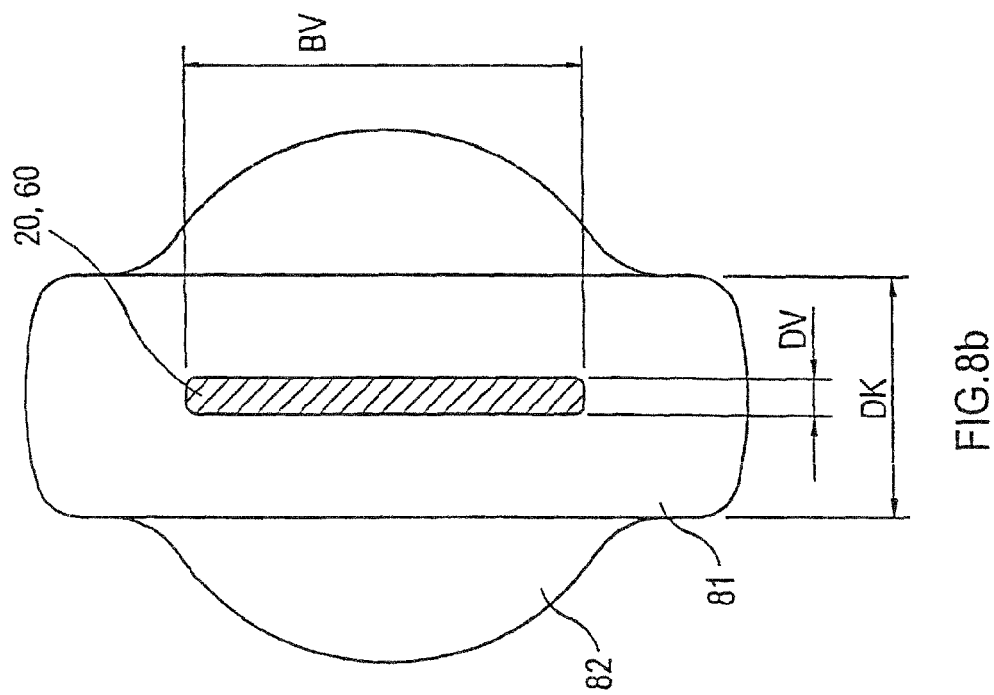

COMPOUND BODY AND A PROCESS FOR THE PRODUCTION OF A MECHANICAL CONNECTION

The present application is a divisional of co-pending U.S. patent application Ser. No. 10/537,980, filed Dec. 8, 2005, which is a U.S. National Stage entry under 35 U.S.C. §371 of International Application No. PCT/EP2003/013022, filed Nov. 20, 2003, claiming priority to German Application Serial No. 10257477.4, filed Dec. 9, 2002, each disclosure of which is hereby incorporated herein by reference in its entirety.

FIELD OF THE INVENTION

This invention relates to a compound body and a process for the production of a mechanical connection according to the preambles of the independent claims. In particular, compound bodies and manufacturing processes are concerned which can be used in applications which are to be air-tight, e.g. lamps, in particular flash bulbs.

BACKGROUND OF THE INVENTION

FIG. 1 shows different known compound bodies and implicitly the production processes thereof. FIG. 1a shows the vacuum-tight passage of a wire 10 through a glass wall 15. Here, the wire is preglazed as indicated by the dashed outline 16. Thereafter, it is melted into a glass tube end (FIG. 1a) or in a glass plate (FIG. 1b). In this case, glass and metal are chosen such that the courses of their coefficients of thermal expansion are as similar as possible from melting point to cooling ("fully adapted"). However, if this full adaptation is not possible, tension cracks may occur in the glass or the wire can separate from the glass. If for directly melting the metal into the glass the misadaptation therebetween is excessively great, the tension can be compensated for step-wise by intermediate glasses 17a to 17c and/or by a dome geometry 17d, as shown in FIG. 1c.

FIG. 1d shows what is called a "cutting edge glassing", FIG. 1e shows "foil squeezing". Here, each metal partner 11, 13 is thin enough to compensate for the optionally occurring deformations so that no dangerous tensions occur in the glass.

FIG. 1f shows the principle of "pressure glassing". Wire and metal plate 12 have a coefficient of expansion somewhat higher than that of the melting glass 15. However, no tension cracks occur in the glass part 15 because following melting-in the metal 12 is shrunk onto the glass 15, thus producing a compressive stress.

FIG. 1g shows an embodiment in which a metallic cap 11 is stuck on a glass tube 15 by means of an epoxy adhesive 18.

FIG. 1h shows the connection of two glass s 15, 14 by means of indium 19.

The compound bodies shown in FIG. 1 have one or more of the following drawbacks:

- The classical melting-in metals tungsten, molybdenum, iron/nickel alloys, iron/cobalt/nickel alloys and copper-clad wires are relatively expensive since they have to be drawn without any defects and be provided with special coatings so as to obtain a successful glass/metal connection.
- Glasses have to be used which, e.g. as regards their strain properties, are adapted as accurately as possible to the melted-in metals. This limits the selection of the glass.
- The use of intermediate glasses (FIG. 1c) often calls for glass-blowing handicraft and is otherwise time-consuming and expensive.
- The production of thin, deep-drawn parts (FIG. 1d) or the use of pin/sheet/pin (FIG. 1e) is expensive.
- Indium-containing solders (FIG. 1h) are expensive and not temperature-resistant.
- Alloys made of iron/cobalt/nickel have a high specific electric resistance.
- Adhesions (FIG. 1g) are not durable and water-permeable.

DE-AS 2150092 discloses a process for connecting glass or ceramics with metals. The metal used is an aluminum-containing copper alloy having an aluminum oxide-containing surface layer. The drawback of this approach is the little ductility and thus poor resistance to thermal shocks and the insufficient connection between glass and metal resulting from the aluminum oxide.

DE-AS 2018752 discloses a process for the gas-tight connection of metal and glass surfaces. The process operates within temperature ranges below the melting point of the metal and forces the surfaces to be connected against each other at high pressure. The drawback of this process is that the resulting connections are insufficient and that it can only be used with rather simple geometries. There is only little resistance to thermal shocks.

DE 3827318A1 discloses a seal between ceramic and metallic articles. Here, a metallic compound sealing element having aluminum as the main constituent is provided with a coating consisting of another metal. The metal is then contacted with the other components and heated above the melting point. The drawback is the elaborate production, the insufficient deformability and the little ductility on the contact surface, which results in a deteriorated resistance to thermal shocks.

It is the object of this invention to provide a compound body which has a firm, durable and vacuum-tight connection resistant to thermal shocks and can be produced at a low price, and a process for the production of a mechanical connection with which a compound body having the above properties can be produced.

This object is achieved by the features of the independent claims. Dependent claims are directed to preferred embodiments of the invention.

SUMMARY OF THE INVENTION

A compound body within the meaning of this invention comprises at least one first body part and a connection. The connection can also be made as a stopper in an opening or a tube end. The first body part is made of glass, the connection is aluminum having a comparatively pure form. The connection is melted on the glass.

In its most common form, the compound body according to the invention is preferably an integral, hollow glass body closed by the connection, preferably in a vacuum-tight fashion.

It was found that aluminum is a metal whose oxide dissolves in glasses, in particular silicate glasses, within specific temperature ranges, thus resulting in an intimate mechanical connection. This solubility of the oxides in silicate glasses is also found with other metals (Mg, Zn, Cd, In, Tl, Sn, Pb, Sb, Bi, Mn). As compared to the latter, aluminum is advantageous because it is inexpensive even in a highly pure form, is a very good conductor for electricity and heat, is highly ductile, adheres particularly well on silicate glasses (soft glasses, hard glasses such as borosilicate and alumosilicate glasses, quartz glass), has a very low vapor pressure at the melting point, is resistant to the atmosphere, adheres well on all commercial metals, is non-toxic, has a favorable temperature processing range and can be wetted directly with soft solder.

For said reasons, it is desired to use aluminum in a rather pure form as a material for a connection to a compound body, although as compared to glasses, in particular silicate glasses, it has a comparatively high coefficient of expansion ($26 \cdot 10^{-6}$/° C. for aluminum, $9 \cdot 10^{-6}$/° C. for soft glasses, $4 \cdot 10^{-6}$/° C. for hard glasses, $0.5 \cdot 10^{-6}$/° C. for quartz glass). It turned out that the markedly differing coefficients of thermal expansion can largely be compensated by the ductility of aluminum. The ductility of aluminum can only be retained at the necessary order if aluminum is relatively pure, i.e. is virtually unalloyed, which can also exclude the provision of a surface coating, in particular in the course of processing. The aluminum portion in the connection material is preferably above 99% by weight, more preferably above 99.9% by weight.

It also turned out that the previous presence of aluminum oxide on the surface of the connection material prior to processing prevents an intimate and plane contact between the aluminum of connection 20 and the glass of body part 15, so that the adhesion might be mechanically firm and possibly also gas-tight (preventing diffusion) but no longer be reliably and lastingly vacuum-tight (preventing diffusion and pressure compensation).

According to the invention, the manufacturing process of the compound body is therefore such that a possible aluminum oxide layer on the aluminum of connection 20 is removed before the aluminum is contacted with glass 15 of the body part in the connection and then the aluminum, heated above the melting point, of the compound 20 is contacted with the glass via its oxide-free surface. This is where the aluminum can react with the glass components, in particular by reducing $SiO_2$ of the glass and combining the oxygen thus released with aluminum to give $Al_2O_3$. The resulting oxide can then diffuse into the glass, as mentioned above, and contribute to an intimate connection. Optionally process parameters can be adjusted so as to support the described kind of oxide formation and oxide diffusion. Further steps described below can be taken, where appropriate. In particular, several or all of the above-mentioned processing steps can be carried out in a protective gas atmosphere or in a vacuum.

BRIEF DESCRIPTION OF THE DRAWINGS

With reference to the drawings individual embodiments of the invention are described below, in which FIGS. 8a to 8c show an embodiment of an end portion of a tubular compound body.

DETAILED DESCRIPTION OF THE PREFERRED EMBODIMENT

Figure 1A:
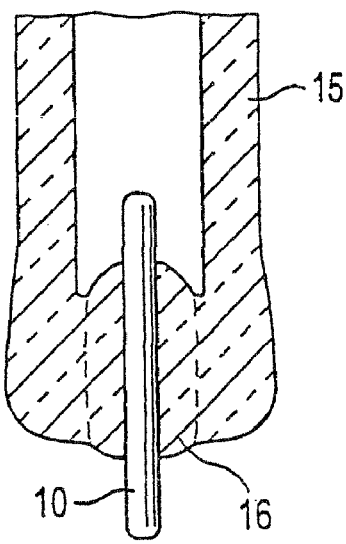
FIGS. 1a to 1h show known compound bodies.
Figure 1B:
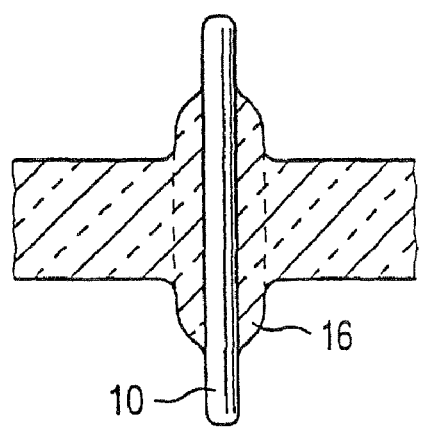
Figure 1C:
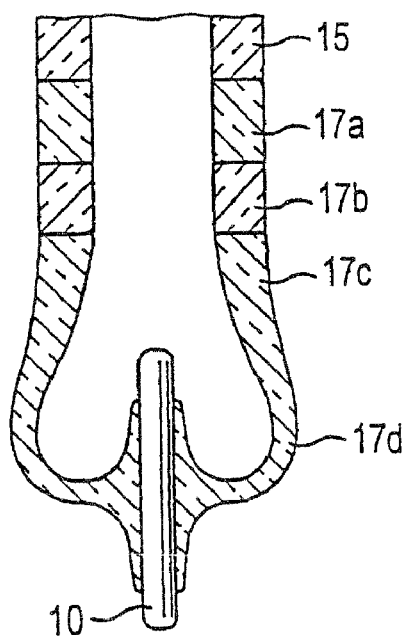
Figure 1D:
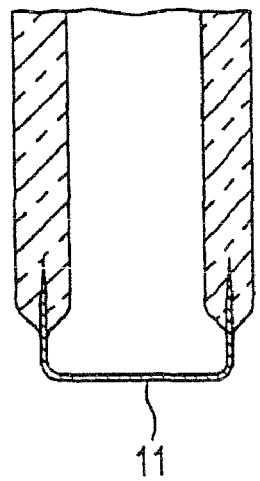
Figure 1E:
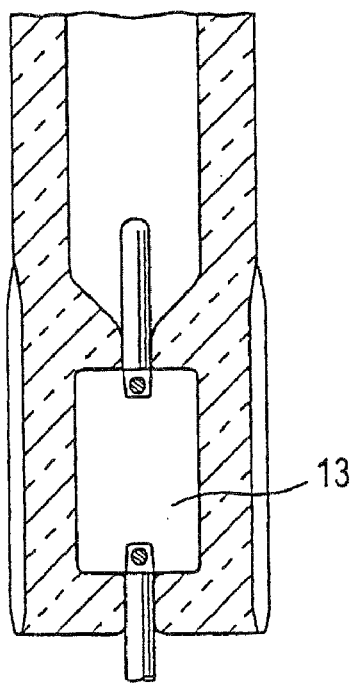
Figure 1F:
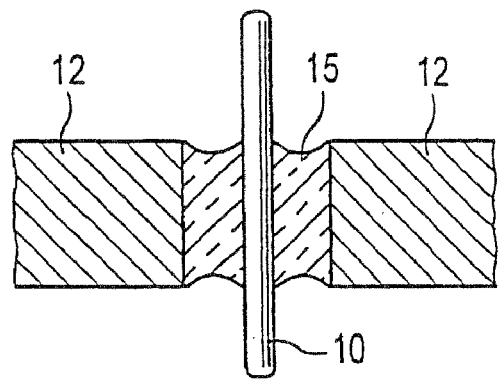
Figure 1G:
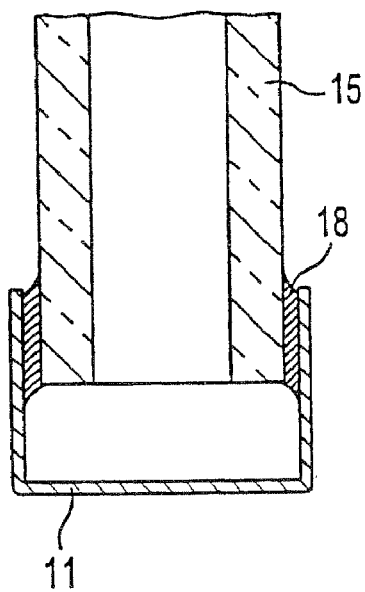
Figure 1H:
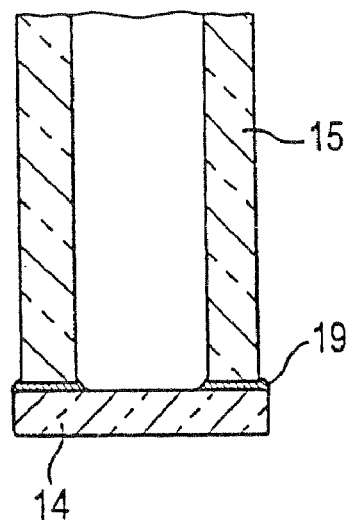
Figure 2:
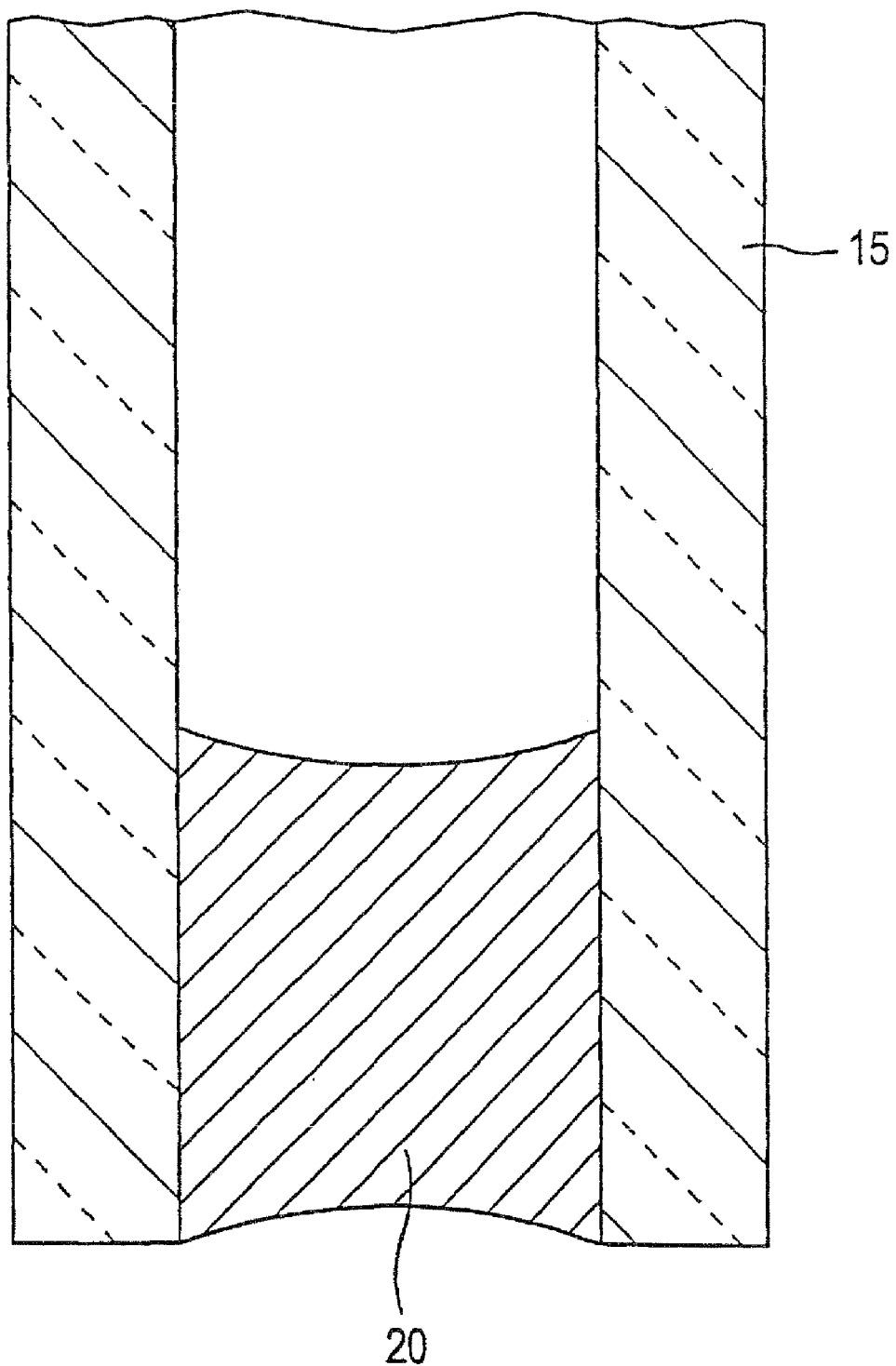
FIG. 2 shows a compound body according to a first embodiment of the invention.

FIG. 2 shows an embodiment of the compound body. The compound body has a first body part 15 and a connection 20. The first body part 15 is made of glass. It may be a glass tube, for example. At one end (not shown), it may be closed by melting. At the other end (shown), it is closed by connection 20. Connection 20 is melted on the first body part 15. The connection includes aluminum. The aluminum has a purity of at least 99% by weight, preferably at least 99.9% by weight. In this respect, it preferably has no metallic alloying elements or admixtures. Preferably, it has no surface coating when processed (e.g. as a protection from oxidation). The connection preferably abuts against the first body part 15 in a vacuum-tight fashion. The tube end which is not shown can also be made in a way according to the invention.

The compound body often has a vacuum-tight design. In its interior, it can be filled with inert gas at low pressure. It may then serve as a gas discharge tube, e.g. as a flash bulb. The flash tube can include the compound body and, based on a small glass tube, be developed as body part 15. One end or both ends of the small tube can be made according to the invention.

Applications for electron tubes are also possible.

Typical dimensions for a small glass tube shown in FIG. 2 have an outside diameter of about 4 mm+/−3 mm, preferably 2.5 mm+/−1 mm, and a length of 20 to 30 mm. The extension of the connection in an axial direction of the small tube may be 1.2 times the inside diameter +/−40%, preferably +/−10%.

Connection 20 is melted on the first glass body part 15. For this purpose, the material of connection 20 is contacted, as desired, with the first body part 15 and heated above its melting point. Having flown the material of the connection and in particular having attached it to the walls of the body part, the entire arrangement is cooled down again.

The process parameters are preferably adjusted such that aluminum oxide forms and can diffuse into the glass so as to form an intimate connection. In particular, the process temperatures are chosen such that the aluminum of connection 20 melts while the glass of the first body part does not yet soften. The temperature can be selected within this temperature range with respect to the improved or optimum diffusion of the aluminum oxide into glass 15.

Connection 20 thus serves for connecting a first body part with a second body part, preferably in a vacuum-tight way, and/or for closing an opening of the first body part.

The connection is preferably produced such that the material of the connection is placed in a solid form into the first body part area where the connection shall be formed subsequently. Then, the connection material is heated together with the one or the several body parts until at least aluminum liquefies. It then enters into the above described intimate connection with the glass. Thereafter, the compound body is cooled again, so that the connection material and in particular the aluminum turn solid again.

The connection is preferably produced in a vacuum or under protective gas. More preferably, care is taken that the surface of the aluminum is available in a pure form and in particular is oxidized only to a minor extent (less than 10% of the natural passivation) or not oxidized (less than 0.5% of the natural passivation) before the connection is produced. Aluminum oxidizes (passivates) in the presence of oxygen and the resulting oxide layer may be too thick to permit the above described diffusion mechanism. In the case of pure aluminum on the surface of the connection material, this aluminum contacts the glass, in particular silicate glass, in a liquid form, reduces the oxides thereof and, as a result, oxidizes itself so that the resulting aluminum oxide can diffuse into the glass.

If protective gas is used, this protective gas can be a gas with which the resulting compound body shall be filled. In particular, the protective gas may include xenon.

Figure 3A:
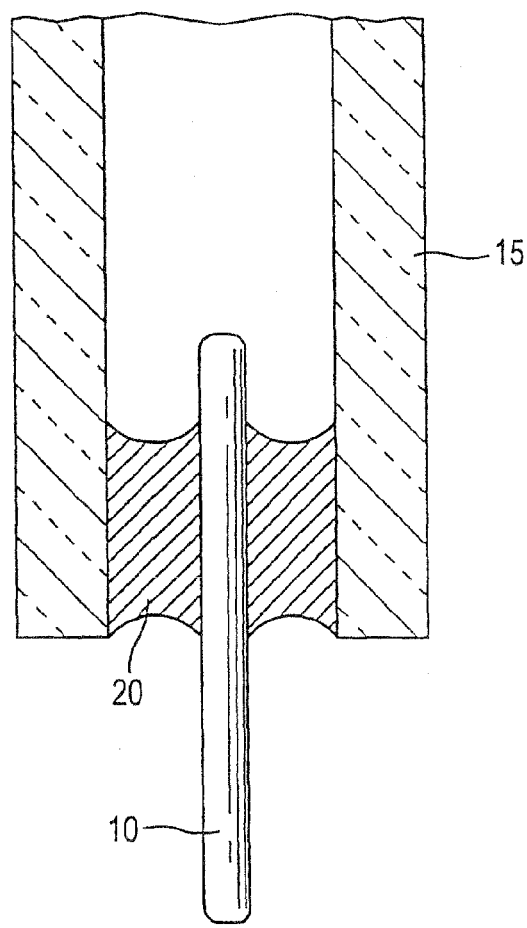
FIGS. 3a and 3b show compound bodies having two body parts.
Figure 3B:
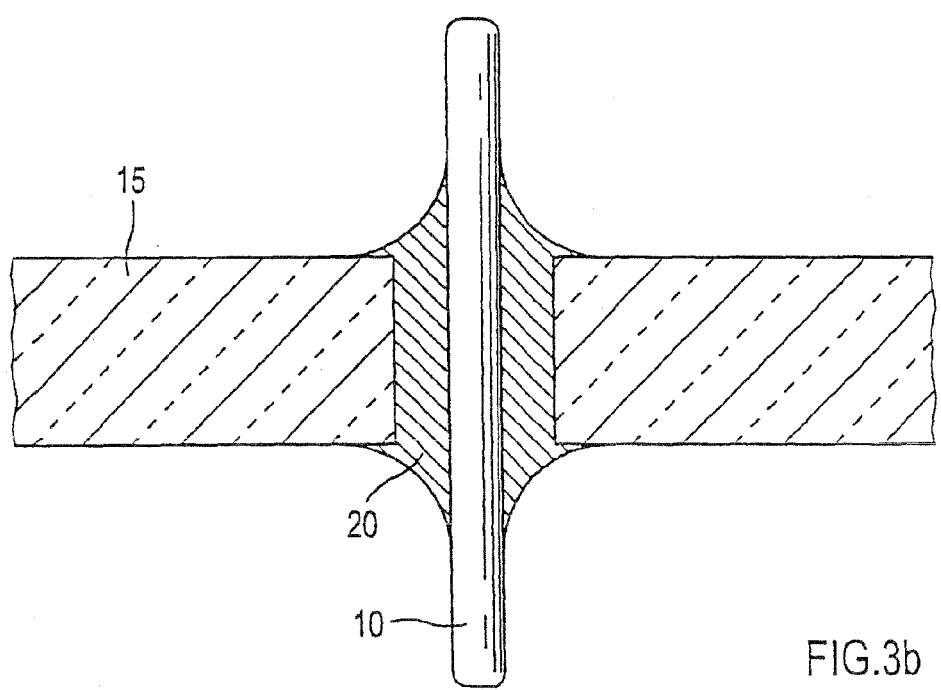

FIGS. 3a and 3b show embodiments in which the resulting compound body has two body parts 15 and 10. 15 is the first body part made of glass, 10 is a second body part, in this case made of metal, e.g. a wire, which may serve as an electrode. In principle, any metal can be selected for the wire, in particular copper. FIG. 3a shows a compound body in which the first body part 15 is a small glass tube (having dimensions as mentioned above, for example) while FIG. 3b shows a compound body in which the first body part 15 is a glass plate. Connection 20 can be made or produced as described above.

Figure 4C:
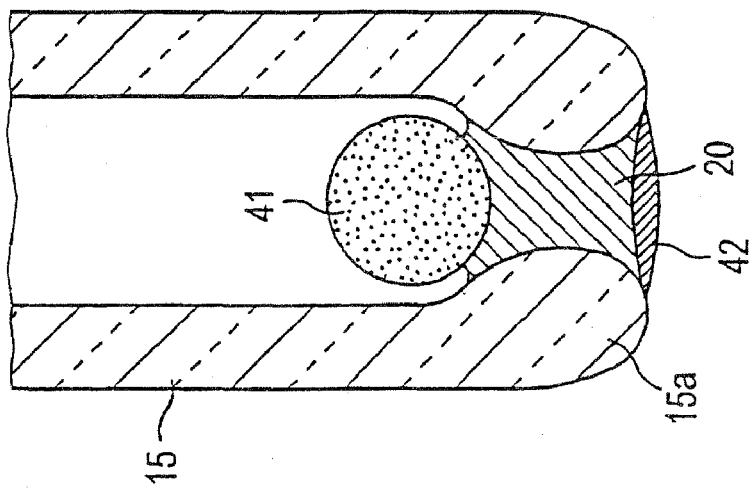
FIGS. 4a to 4c show compound bodies for increased thermal alternating loads.
Figure 4B:
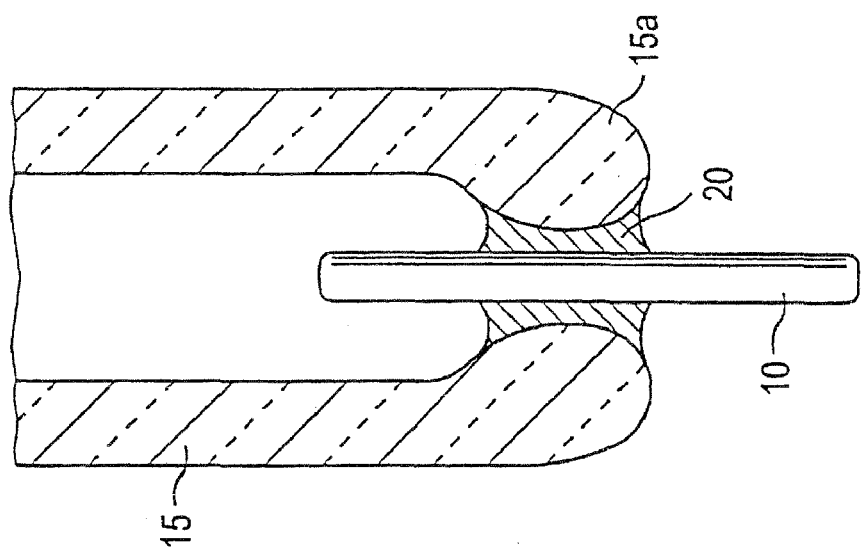
Figure 4A:
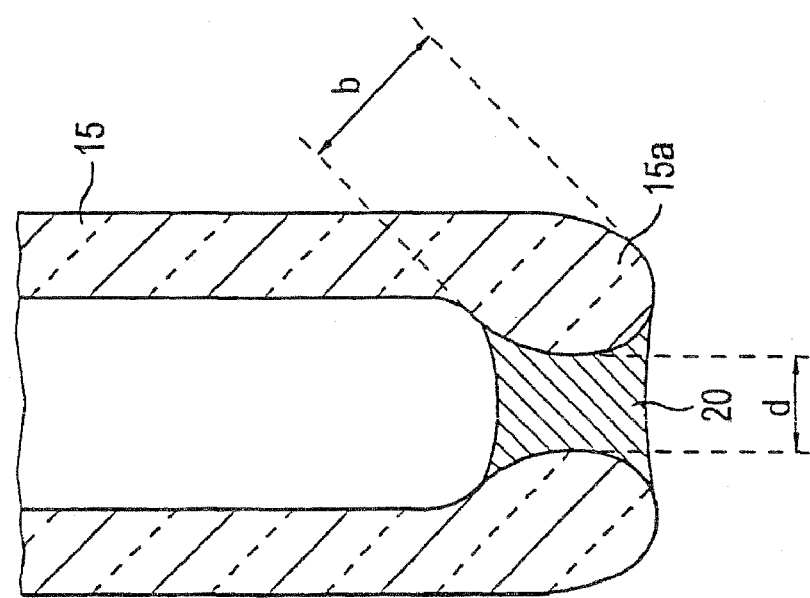

FIGS. 4a to 4c show embodiments for increased thermal alternating loads. They are suited for thermal alternating loads of up to 150° C. when the produced article is used. Each embodiment of FIGS. 4a to 4c has a reinforcement and/or rounded edges 15a in the areas in which the first glass body part 15 contacts connection 20. Preferably, when an opening is closed according to FIGS. 4a and 4c, diameter b of the edge reinforcement can be larger than diameter d of the opening to be closed. FIG. 4b shows the case in which a metallic pin or a wire forms a second body part 10 of the compound body. FIG. 4c shows an electrode which in the small tube interior is melted on the connection 20. Electrode 41 may be a sintered body. 42 refers to a solder, preferably a soft solder, which partially or fully covers the outside of connection 20. As shown, the soft solder may protrude beyond the tube end downwardly. The connection can protrude beyond the tube end downwardly or be flush therewith or, as shown in FIG. 1 or 4c, may remain behind it.

Figure 5B:
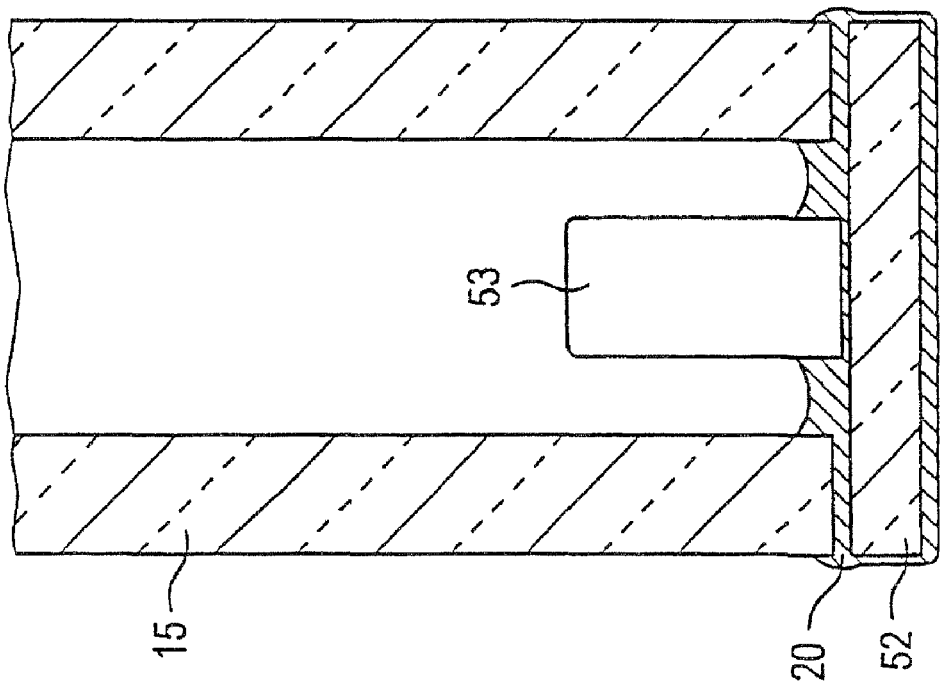
FIGS. 5a to 5d show compound bodies having an auxiliary body or a second body part.
Figure 5A:
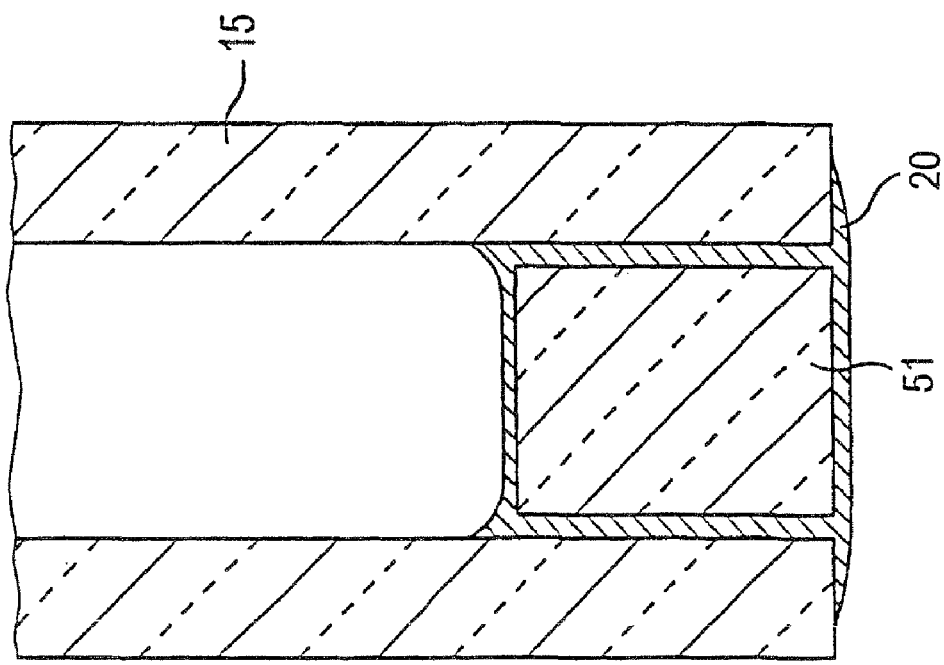
Figure 5D:
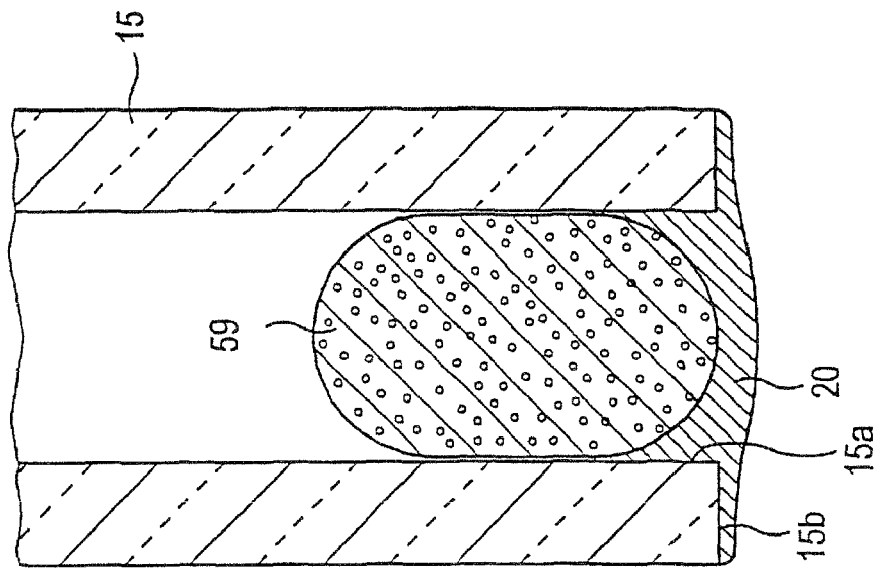
Figure 5C:
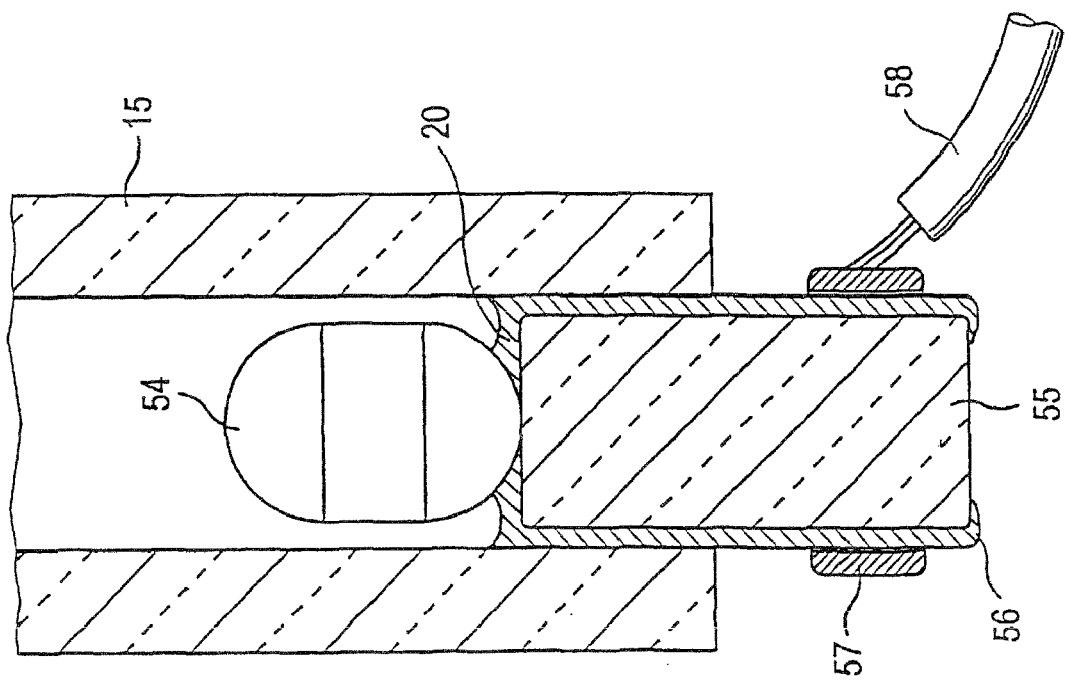

FIGS. 5a to 5d show embodiments which are suited for high thermal alternating loads when the compound body is operated. Here, auxiliary bodies 51, 52 or second body parts 55 are used by way of example together with compound composed as described above to close an opening, the auxiliary bodies 51, 52 or the second body part 55 having a coefficient of thermal expansion which is less than that of aluminum and preferably is approximately the same as that of the first body part 15 (deviation less than 50%). The auxiliary body 51, 52 is then placed into or over the opening to be closed of the first body part 15. Subsequently, a connection 20 is again made between the first body part 15 and auxiliary body 51, 52 or the second body part 55. Auxiliary body 51, 52 or the second body part 55 can previously be coated with a metal 56, in particular aluminum, or the compound material. This coating can be carried out in a way equal to the production of the inventive compound between connection and body part according to the invention, as described. Auxiliary body 51, 52 or the second body part 55 may consist of glass or a material the same as that of the first body part 15 and can have a coefficient of thermal expansion which is equal to or less than the latter. Even in the case of elevated temperature differences during the operation only minor tensions result on account of the comparatively small dimensions of the connection cross-sections. Said tensions can be compensated for by the ductility of aluminum. FIG. 5b shows an embodiment in which on the inside of the auxiliary body 52 a metallic component 53 is mounted. It can be contacted externally via connection 20 since connection 20 extends from the inside to the outside of the first body part. FIG. 5c shows an embodiment in which a second body part 55 is threaded into the opening where it is connected intimately via connection 20 with the first body part 15. The protruding part of the second body part 55 can be used to attach thereto a cable 58, optionally by means of a clamp or clip 57 or via a soldering (not shown). Another electrode 54 is mounted on the inside of the second body part 55.

FIG. 5d shows an embodiment in which the opening of the first body part 15, here a glass tube having preferably the dimensions as described above, is occupied substantially by a second body part 59 which can serve directly as an electrode. The second body part 59 may be a metallic sintered body which can be porous. On its side facing the tube opening (in FIG. 5d below) the sintered body is fully coated with aluminum or aluminum alloy 20. The coefficient of expansion of the second body part 59 is smaller than that of aluminum. The second body part 59 is mechanically held, sealed and contacted electrically by the aluminum layer 20 at the end of the glass tube.

The aluminum serving as a connection 20 preferably protrudes from the cut face of the tube. In FIG. 5d, connection 20 thus protrudes farther downwards than the lowermost edge of the glass tube. Connection 20 can be designed such that it does not only cover the inside wall 15a of the first body part 15 but also the front face 5b. In this case, the aluminum or connection 20 does not have to cover the second body part 59 over its entire extension into the tube. Starting from the open end, the connection 20 can cover it e.g. by less than half the extension into the tube, preferably less than one third of this extension.

In this embodiment, connection layer 20 may be comparatively thin since in the area of the opening of tube 15 it shall only close the porous second body part 59 in a vacuum-tight fashion. The mechanical stability of the structure is ensured by the stable second body part 59 itself which substantially supports connection layer 20. Connection 20 can also serve as an electrical contact for the second body part 59.

FIGS. 6a to 6d show embodiments in which the connection comprises aluminum, on the one hand, and a filler 60, on the other hand. In connection with this embodiment, statements on the aluminum content of the connection have to be regarded as based on the metallic portion of the connection, i.e. without taking into account the filler. The filler is chosen such that it has a coefficient of thermal expansion which is less than that of aluminum. In particular, filler 60 can be chosen such that it has a coefficient of thermal expansion which is approximately equal to that of the first body part 15. It may also be less than this one. It may be glass grains or fine glass powder. Thus, the mixture of aluminum and filler has a coefficient of thermal expansion approaching that of the first body part 15. Thus, this embodiment is also suited for high thermal alternating loads during the operation. If a glass powder having a comparatively low coefficient of thermal expansion (e.g. quartz glass) is used as a filler, the adjustment of the mixing ratio between filler and aluminum serves for achieving a coefficient of thermal expansion which is very close to that of the first body part 15 if the latter has a coefficient of thermal expansion which is between that of aluminum and that of the filler (e.g. borosilicate glasses). Aluminum can be mixed with the filler in a way equal to the production of the inventive connection between connection and body part, as described, i.e. in particular by freeing an oxide layer from aluminum before the filler is admixed.

Figure 6B:
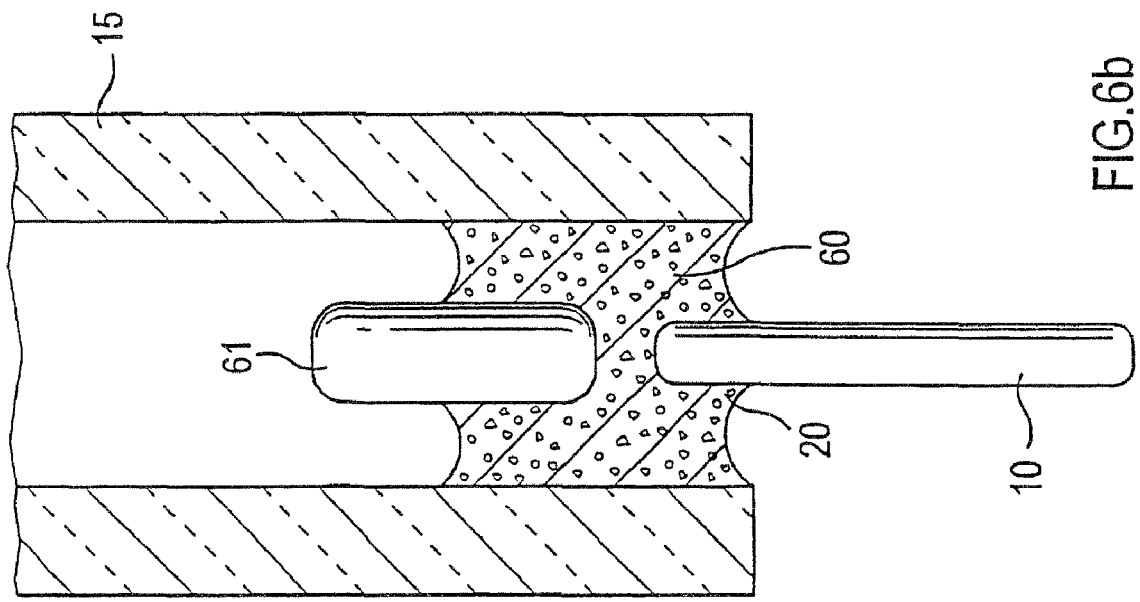
FIGS. 6a to 6d show a compound body whose connection is a mixture of materials.
Figure 6A:
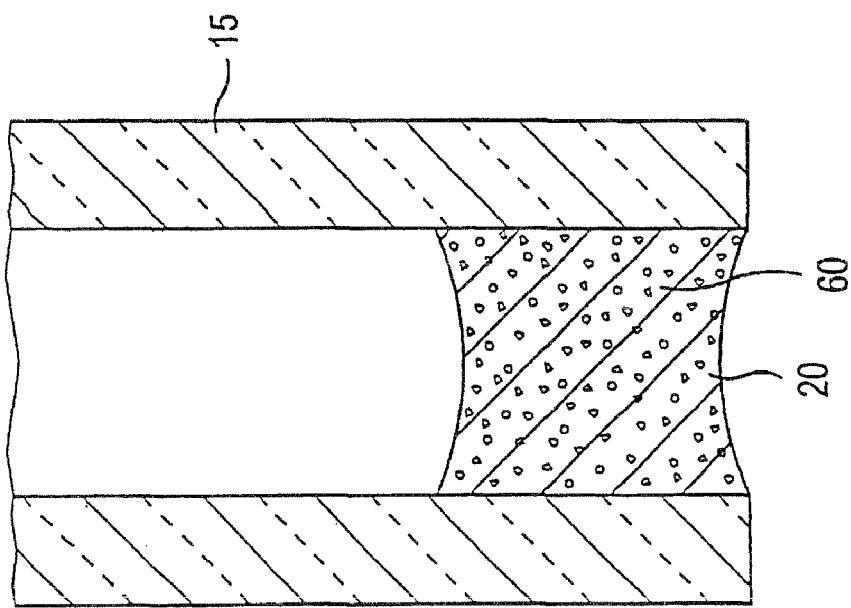
Figure 6D:
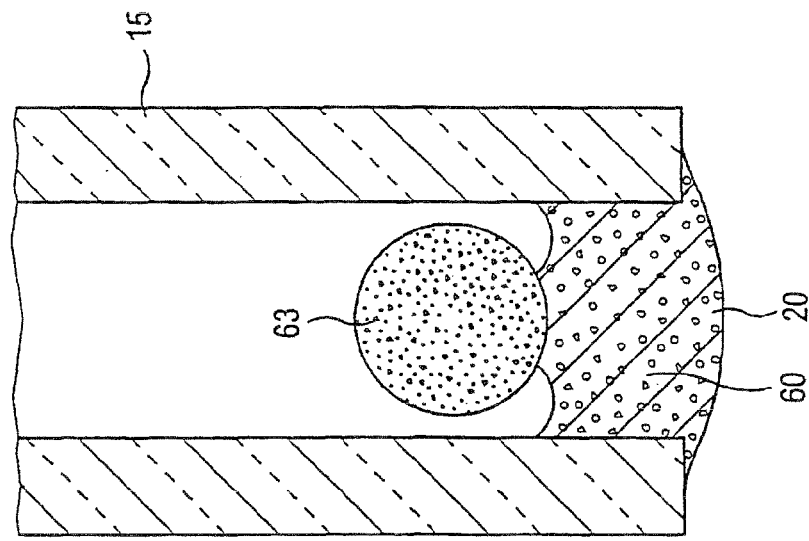
Figure 6C:
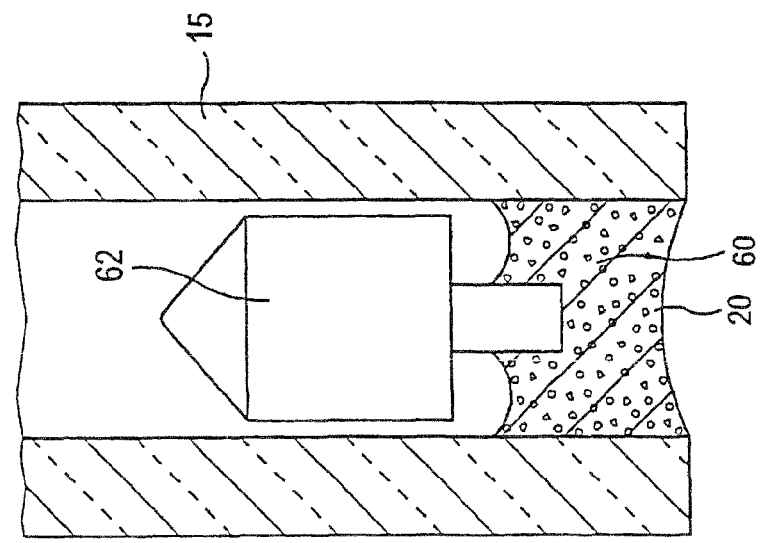

FIG. 6a shows an embodiment in which one end of the small tube 15 is closed with connection 20, 60. FIG. 6b shows an embodiment in which a wire 10 (as second body part) is placed into connection 20, 60 from outside. An electrode 61 is melted into connection 20, 60 from within. Electrode 61 may have select materials, as required, e.g. tungsten. Optionally the wire can also be connected through (integrally). FIGS. 6c and 6d show embodiments in which electrodes 62, 63 are only on the inside of connection 20, for certain purposes. They are melted into connection 20, 60 and protrude inwardly therefrom. 62 is a metallic electrode having a certain geometry, 63 is a sintered body. The mixture connection 20, 60 can also be used for the embodiment of FIG. 5d.

Filler 60 can be glass powder, glass particles, glass grains or fine glass powder and/or another grainy or powdery/grainy material, e.g. tungsten and/or molybdenum. The basic material is aluminum, preferably with the above-mentioned purity.

Figure 7:
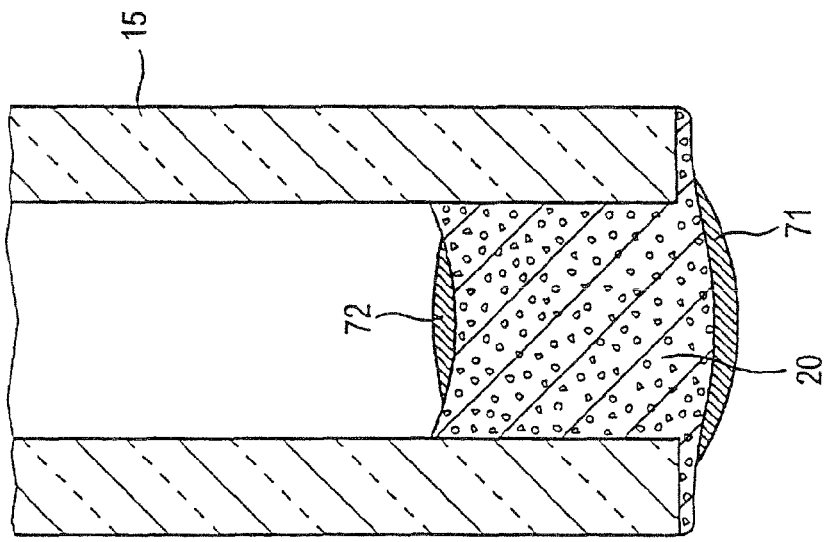
FIG. 7 shows another embodiment.

FIG. 7 shows another embodiment. The first body part 15 is a small tube, one end of which is closed with connection (optionally with filler 60). Connection 20, 60 can have variations of material on the inside and/or outside. An embodiment is shown in which on the outside of connection 20, 60 a solder layer 71 is applied. This layer may be a tin-lead solder, for example. The layer can be applied subsequently after forming connection 20, 60. It is then usually a discrete, distinguishable layer. On the inside, a layer 72 serving as a cathode is shown. It may include cesium and/or barium and/or the oxides thereof. Layer 72 can be applied subsequently or be molten on and is then also discrete and can be distinguished from connection 20, 60. However, it can also be alloyed into connection 20, 60. This can be done e.g. as follows: When the connection is formed, it is not only the solid connection material 20, 60 that is introduced into the small tube prior to melting but also the material of cathode 72. When connection 20, 60 is melted, the electrode material melts as well, so that diffusion and thus mixing occurs between electrode material and connection material. This is effected mainly at a distance from the contact surface between connection 20, 60 and body part 15.

The connection can have a metallic coating on its outside, which has in particular one or more of the elements tin, silver, copper, zinc, cadmium, lead or having alloys of one or more of these elements. The coating can be provided in particular to render the outside soft-solderable.

Figure 8A:
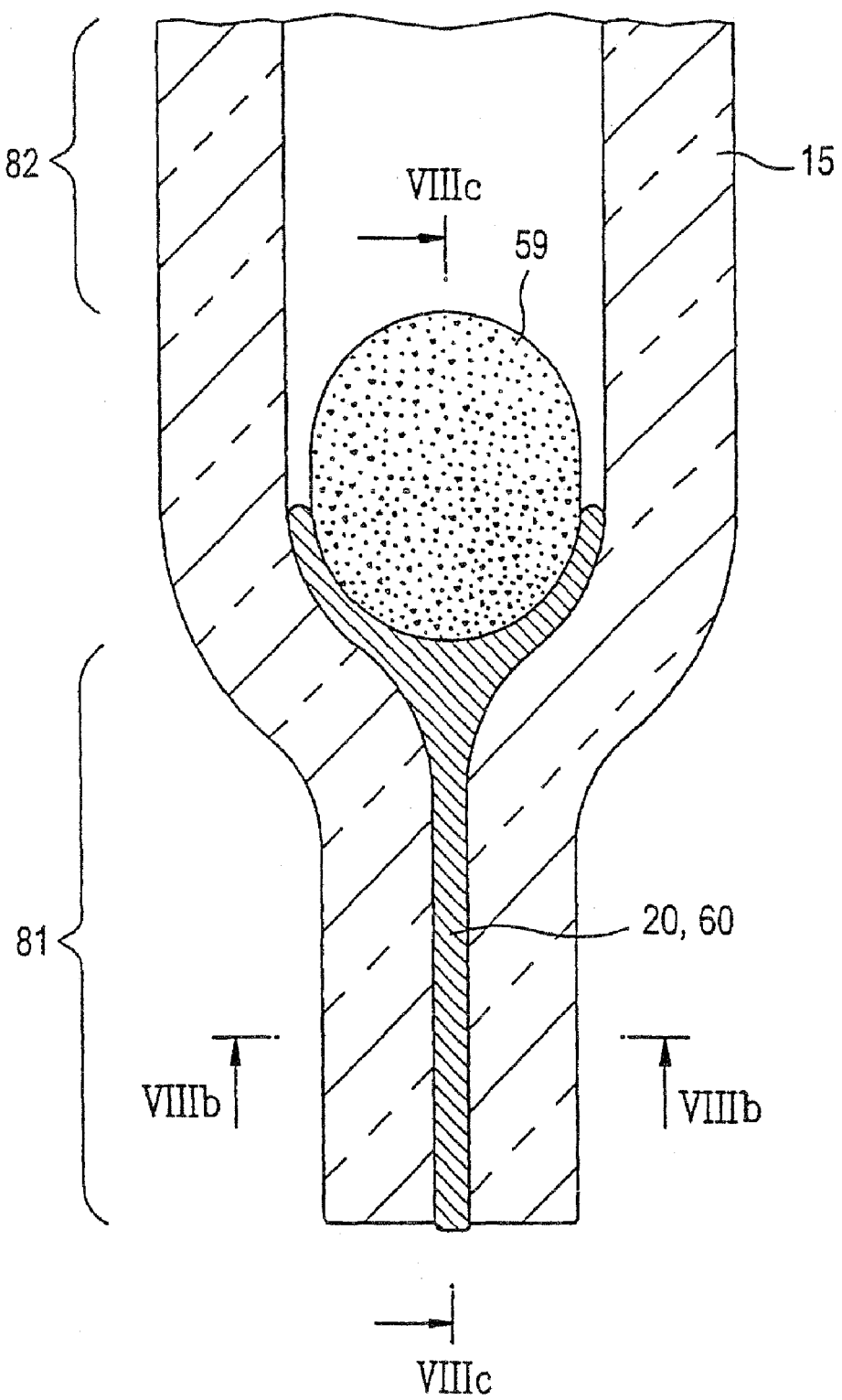

FIGS. 8a to 8c also show embodiments particularly suited for high thermal alternating loads. The compound body is substantially a glass tube 15 having optional main dimensions, as mentioned above. The focal length of the flash bulb (width between the electrodes) can cover a range of 12, preferably 17 mm and/or be less than 30, preferably less than 25 mm. The glass tube has a free area 82, where the electrophysical processes which cause the luminous effect substantially take place. The free area 82 thus extends substantially over the focal length of the glass tube and can optionally also include the electrode lengths fully or partially. Glass tube 15 also has a closure area 81 where the glass tube is closed in vacuum-tight fashion by connection 29, 60. Even though FIG. 8a only shows one end of the class tube, the other end can be developed in the same way.

In closure area 81 of the glass tube, at least in some parts, the cross-sectional shape may differ from the free area 82. In particular, the cross-section may be flattened. A cross-section (according to FIG. 8b) can be such that a cross-sectional dimension DV is at most 1 mm, preferably at most 0.3 mm, more preferably at most 0.1 mm. The flattening can be such that said cross-sectional dimension DV is no more than 30 µm or even no more than 10 µm. As a result, the volume to be filled with connection 20, 60 becomes comparatively small so that thermal expansions are also less noticeable. The second body part 59 can be attached or electrically connected as described with reference to FIG. 4c, 5d or 6b. The second body part 59 is substantially in the free area 82 of tube 15. Connection 20, 60 occupies preferably completely the remaining residual volume in the closure area, in particular up to the tube end, so that connection 20, 60 can also serve for the external electric coupling.

Dimension DV of the connection in the closure area 81 may be less than 10%, preferably less than 3%, more preferably less than 1%, of cross-sectional dimension DK through the entire body at the same site.

FIG. 8c shows another cross-section through the design of FIG. 8a. The section of FIG. 8c extends perpendicularly through the plane of projection of FIG. 8a and perpendicularly to the section of FIG. 8b. In this cutting plane, the width of connection BV is wider than the inside diameter DI of tube 15 in the free area 82. If such an embodiment is chosen together with that according to FIGS. 8a and 8b, the thinning of the connection can easily be achieved by flattening the end region of tube 15 together with connection 20, 60.

Quite generally, a compound body according to one of FIGS. 8a to 8c can be obtained by a mechanical deformation of the compound body after inserting connection 20, 60. For example, the structure can be heated above the softening point of the glass of tube 15, followed by flattening. Then, embodiments according to FIGS. 8b and 8c are obtained.

Figure 9:
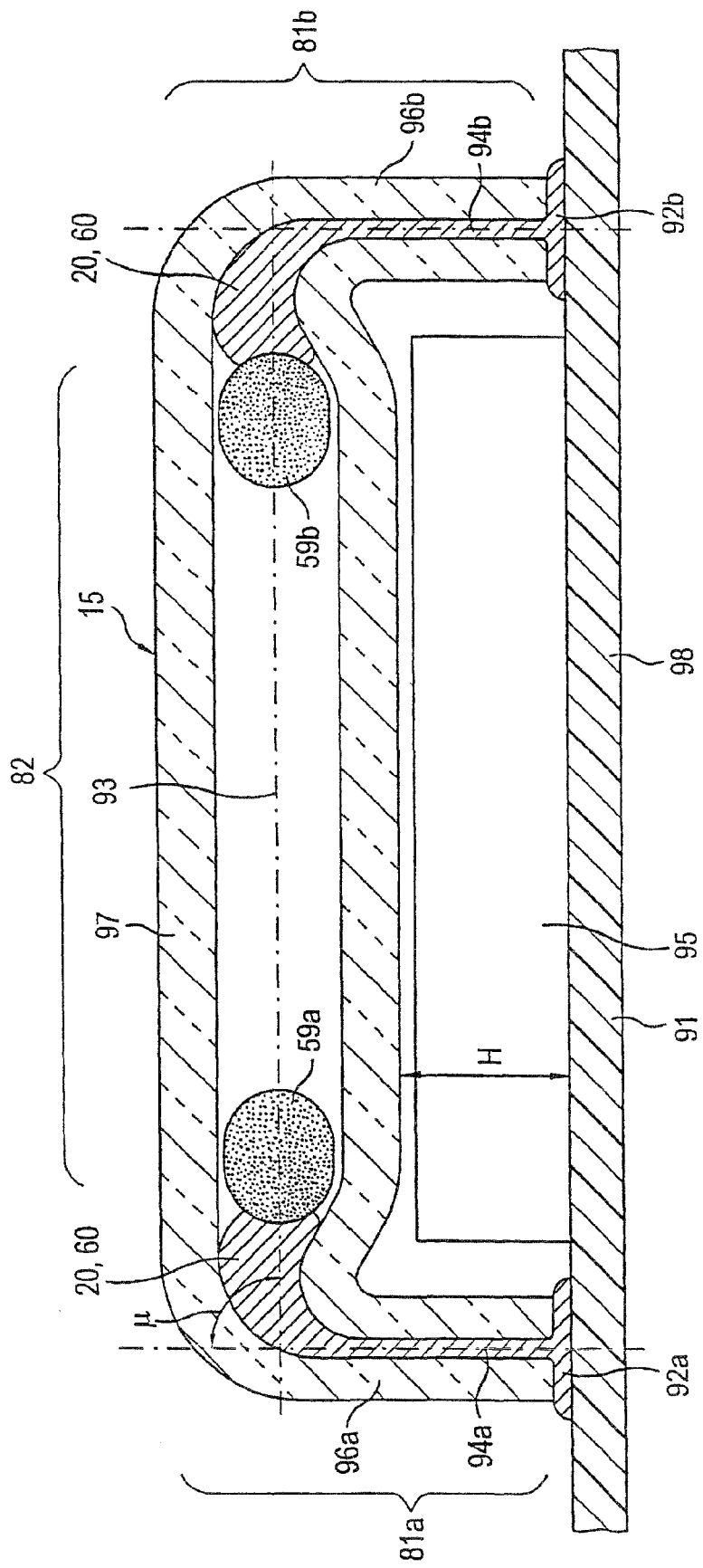
FIG. 9 shows an embodiment of a gas discharge lamp or a flash bulb.

FIG. 9 shows another embodiment. Here, closure areas 81a and 81b can be made in the same way on both ends of glass tube 15. FIG. 9 shows an embodiment where the closed ends are bent. The longitudinal axis 93 of glass tube 15 encloses with axis (or in the case of bent embodiments of the tangent at the end of the tube) 94a or 94b an angle µ which may range from 45 to 135°, preferably 80 to 100°. µ may substantially be a right angle. Closure area 81a can be designed—but does not have to be—as described by means of FIGS. 8a-c.

Connection 20, 60 preferably occupies the tube up to the free end thereof (in the figure below) so that it can serve as an electric connection. The electrode inside the glass tube 15 can be coupled electrically and mechanically as described with reference to FIG. 5d or 6d. Electrodes 59a and 59b can be designed as metallic sintered bodies (according to FIG. 5d or 6d).

The bent regions 96 preferably have a cross-sectional shape as shown in FIG. 8b, dimension DV is within the plane of projection of FIG. 9, dimension BV extends perpendicularly to the plane of projection.

The length of bent regions 96a and 96b is preferably such that the straight region 97 of tube 15 has a height H above the pc board 98 so that a reflector 95 fits thereunder and may optionally also have a lateral extension (beyond the plane of projection).

By the structure shown in FIG. 9 the compound body designed as a means of lighting, in particular a gas discharge tube or flash bulb, can be mounted directly on a pc board 98. The means of lighting is thus designed as an SMD (surface mounted device). Similarly to FIG. 4c or FIG. 7 the front faces may have a solder layer (e.g. tin-lead solder). The bend can be carried out even if e.g. a cross-sectional shape according to FIG. 8b is established. Here, it is possible to proceed such that a bend is first effected slowly and then the flattening is made. If the flattening is made by squeezing the end of tube 15, connection material 20, 60 may be forced out of the free end. This material can be removed or be distributed over the front face of the tube end.

The characteristics described with reference to FIGS. 2 to 8 can be combined with one another. The invention is particularly suited for molded bodies forming part of a gas discharge tube, an electron tube or a means of lighting. In the case of gas discharge tubes, flash bulbs should be mentioned particularly. They are usually small tubes filled with an inert gas and closed in a vacuum-tight fashion. They include two electrodes each having to penetrate the glass housing wall in a vacuum-tight fashion. In this connection, it is pointed out that, in particular without a second body part (as shown in connection 20, 60 may serve quite generally as an electrode on the inside and/or as an electric connection on the outside (see FIGS. 2, 4a, 6a and others). The electric conductivity of aluminum is high enough for an electric connection to be effected with sufficiently small losses from the inside to the outside through connection 20, 60 as such. Additional electrodes 10 are selected optionally in accordance with further aspects.

The invention claimed is:

1. Method for producing a flash lamp, comprising the steps of:
   providing a first body part consisting of or containing glass and having an opening, and
   attaching a connection to the first body part, wherein
      aluminium having a purity of at least 99 weight percent is used for the connection,
      the connection is heated beyond its melting point and melted onto the first body part,
      the connection being purified from oxide components before melting it onto the first body part, and
      the opening of the first body part being closed by the connection.

2. The method according to claim 1, wherein after heating beyond its melting point the connection is purified from oxide components.

3. The method according to claim 1, wherein the first body part is connected to a second body part by means of the connection.

4. The method according to claim 1, wherein before producing the connection the first body part is at least regionally rounded where it contacts the connection, particularly by beginning to melt the body part.

5. The method according to claim 1, wherein before attaching the connection to the first body part where it contacts the connection a material reinforcement is at least regionally formed, particularly by beginning to melt the body part.

6. The method according to claim 1, wherein an auxiliary part consisting of material having a thermal expansion coefficient smaller than that of aluminium, preferably glass, is positioned in the opening and then connected to the first body part by means of the connection.

7. The method according to claim 1, wherein before attaching the connection the aluminium-containing substance is mixed and melted with a grained and/or powdery filler having a thermal expansion coefficient smaller than that of aluminium.

8. The method according to claim 1, wherein the melting of the connection onto the first body part is accomplished in the absence of oxygen, preferably in a protective gas atmosphere or in a vacuum.

9. The method according to claim 8, wherein a gas is used as a protective gas with which the closed composite body is to be filled.

10. The method according to claim 1, wherein the melting of the connection onto the first body part is accomplished at a temperature at which the connection has melted and at which the glass does not soften.

11. The method according to claim 10, wherein the melting of the connection onto the first body part is accomplished at a temperature which facilitates the diffusion of alumina into the glass.

12. The method according to claim 1, wherein during producing the mechanical connection the connection material and the first body part are gradually heated together.

13. The method according to claim 1, wherein a tubular body part is used the end of which is flattened.

14. The method according to claim 13, wherein the flattening is performed after attaching the connection, the glass being heated beyond its softening point before the flattening.

15. The method according to claim 13, wherein the end the tube is bent.

16. The method according to claim 1, wherein the connection is heated to at least 700° C. before it is melted onto the first body part.

17. The method according to claim 1, wherein the heating of the connection and its purification from oxides is accomplished in a protective gas atmosphere.

* * * * *